US006401883B1

(12) United States Patent
Nyce et al.

(10) Patent No.: US 6,401,883 B1
(45) Date of Patent: *Jun. 11, 2002

(54) VEHICLE SUSPENSION STRUT HAVING A CONTINUOUS POSITION SENSOR

(75) Inventors: David S. Nyce, Apex; Arnold F. Sprecher, Jr.; Stephen W. Smith, both of Raleigh; Mauro G. Togneri, Cary; Peter T. Tola, Jr., Raleigh, all of NC (US)

(73) Assignee: MTS Systems Corporation, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/502,990

(22) Filed: Feb. 11, 2000

Related U.S. Application Data

(60) Provisional application No. 60/155,606, filed on Sep. 22, 1999.

(51) Int. Cl.[7] ............................................. F16F 15/03
(52) U.S. Cl. ...................................................... 188/266
(58) Field of Search ......................... 188/266; 333/148, 333/149; 324/207.13, 235, 207.22; 73/313, 314, 862, 333

(56) References Cited

U.S. PATENT DOCUMENTS

| 4,140,044 A | 2/1979 | Biller et al. ................... 92/5 R |
| 4,455,555 A | 6/1984 | Symonds et al. ............ 340/870 |
| 4,502,006 A | 2/1985 | Goodwin et al. ............ 324/208 |
| 4,638,670 A | 1/1987 | Moser ........................... 73/658 |
| 4,883,150 A | 11/1989 | Arai ............................. 188/289 |
| 4,926,154 A | 5/1990 | Heremans et al. ............. 338/32 |
| 4,963,759 A | 10/1990 | Leonti et al. ................. 280/670 |
| 5,074,579 A | 12/1991 | Evangelisti .................. 280/668 |
| 5,136,884 A | 8/1992 | Lovett ........................... 73/313 |
| 5,150,049 A | 9/1992 | Schuetz ................. 324/207.12 |
| 5,233,293 A | 8/1993 | Huang et al. .......... 324/207.15 |

(List continued on next page.)

FOREIGN PATENT DOCUMENTS

| CA | 636161 | 2/1962 |
| EP | 0 093 870 | 10/1986 |

OTHER PUBLICATIONS

J. P. J. Groenland, "Magnetoresistive Transducer for Absolute Position Detection", IEEE Transactions on Magnetics, vol. Mag–20, No. 5, Sep. 1984, pp 969–971.

Catalog: Temposonics™—Linear Displacement Transducers "Linear displacement transducers for absolute noncontact position sensing", MTS Systems Corporation, Eden Prairie, MN, 1988.

T. Lynch, Editor, "Non–contacting Sensor Handles Demands of Road Sensing Suspension", *Design News*, Feb. 22, 1993, pp. 150–151.

Brochure: "Temposonics II: The highly repeatable position sensor, proven reliable in the most demanding factory settings" MTS Systems Corporation, Eden Prairie, MN, 1995.

Brochure: "Temposonics—Product Line Overview", MTS Systems Corporation, Eden Prairie, MN, 1995.

*Primary Examiner*—Christopher P. Schwartz
*Assistant Examiner*—C. T. Bartz
(74) *Attorney, Agent, or Firm*—Westman, Champlin & Kelly, P.A.

(57) ABSTRACT

A vehicle suspension apparatus according to the invention includes a vehicle suspension strut and a continuous position sensor coupled to the vehicle suspension strut and adapted to provide information indicative of a continuous position of a first portion of the vehicle suspension strut relative to a second portion of the vehicle suspension strut. The continuous position sensor includes a magnet coupled to the first portion of the vehicle suspension strut and a sensing mechanism coupled to the second portion of the vehicle suspension strut and responsive to the magnet to provide an output indicative of the continuous position of the first portion relative to the second portion.

9 Claims, 11 Drawing Sheets

U.S. PATENT DOCUMENTS

| | | | |
|---|---|---|---|
| 5,313,160 A | 5/1994 | Gloden et al. | 324/207.13 |
| 5,359,288 A * | 10/1994 | Riggs | 324/207.22 |
| 5,477,771 A | 12/1995 | Black | 92/5 R |
| 5,502,380 A | 3/1996 | Sittler et al. | 324/207.21 |
| 5,670,876 A * | 9/1997 | Dileem | 324/207.13 |
| 5,797,618 A | 8/1998 | Brokholc | 280/689 |
| 5,952,823 A | 9/1999 | Nyce et al. | 324/207 |

* cited by examiner

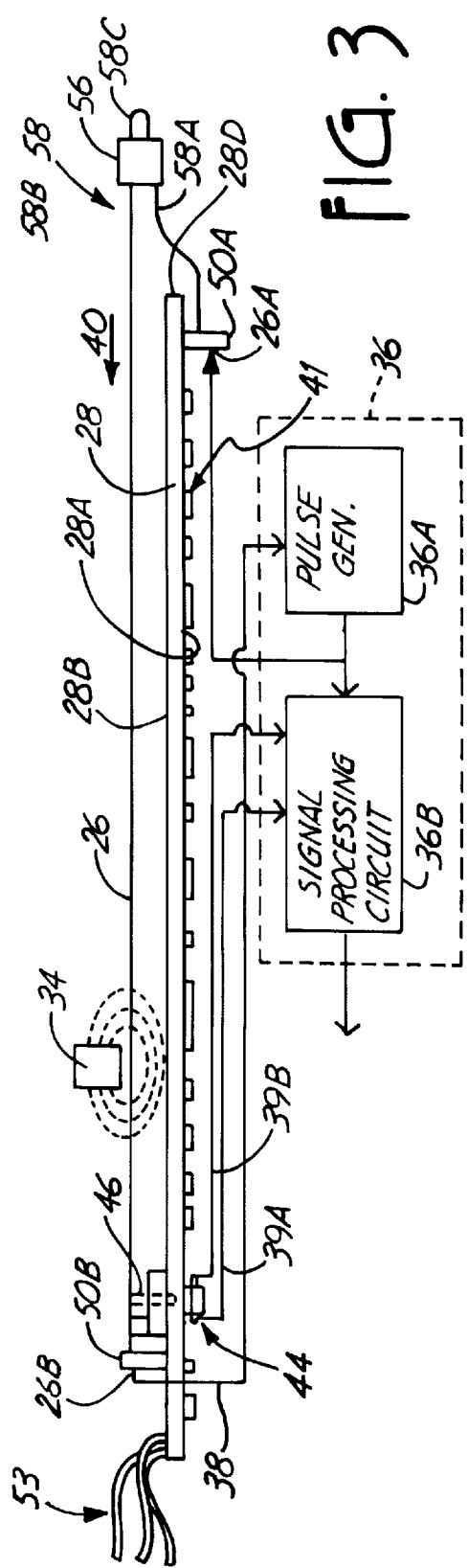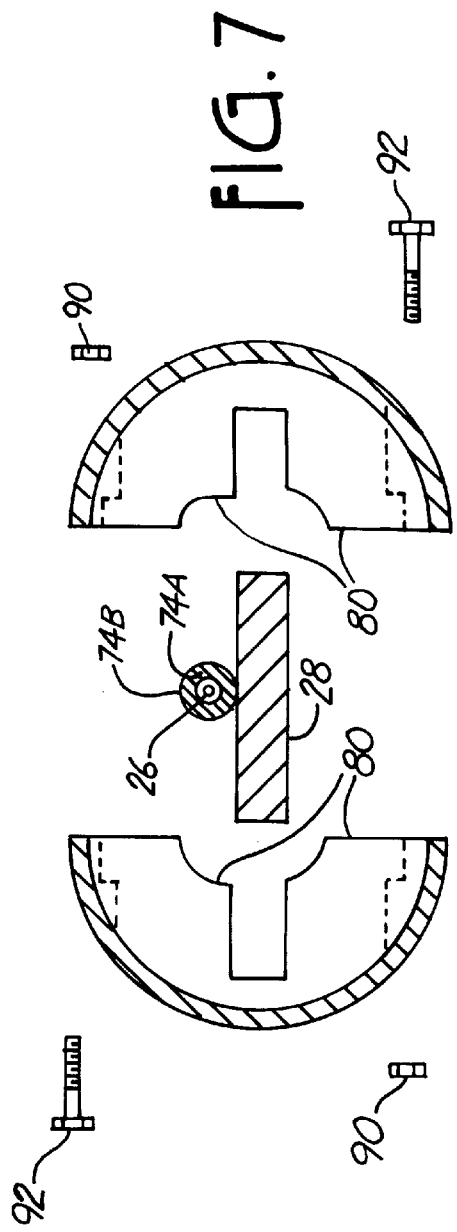

VEHICLE SUSPENSION STRUT HAVING A CONTINUOUS POSITION SENSOR

The present application claims the benefit of earlier filed U.S. Provisional Application No. 60/155,606, filed on Sep. 22, 1999 and of U.S. patent application Ser. No. 09/391,038, entitled "MAGNETOSTRICTIVE LINEAR DISPLACEMENT TRANSDUCER FOR A SHOCK ABSORBER", filed on Sep. 7, 1999, which is a continuation of U.S. patent application Ser. No. 08/828,193, filed on Mar. 21, 1997 and now issued as U.S. Pat. No. 5,952,823.

BACKGROUND OF THE INVENTION

The present invention relates to sensors to measure the speed and/or position of a piston in a cylinder. More particularly, the present invention relates to magnetic displacement transducers for use in vehicle suspension struts.

Various devices have been advanced to measure the distance traveled by a piston in a cylinder. One common application is determining the movement of the piston in a hydraulic, pneumatic or hydro-pneumatic vehicle suspension strut such as a shock absorber, where the piston moves axially in a cylinder filled with at least one damping medium. U.S. Pat. Nos. 4,502,006; 4,638,670 and 5,233,293 each disclose a displacement sensor to perform this function. As of yet, none of the devices so far advanced have been widely accepted in the automotive industry. Although many systems can accurately measure motion of a piston in a cylinder, a simple transducer that can be easily incorporated into the strut in order to keep manufacturing costs down is still desired by many.

As mentioned, in some prior art vehicle suspension struts, position sensors have been included for use in determining a position or a rate of movement of the piston within the cylinder. In some prior art struts having position and/or rate of movement sensors, the sensor is expensive and complicated to manufacture. Further, some prior art vehicle suspension struts have position sensors which are capable of providing information indicative of discrete (discontinuous) positions, but not information indicative of continuous positions. This limits the accuracy of the position sensor.

As an example, in U.S. Pat. No. 4,883,150 entitled "HYDRAULIC SHOCK ABSORBER WITH PISTON ROD POSITION DETECTING MEANS" issued on Nov. 28, 1989 to Susumu Arai, a position sensor is included in the strut to provide information indicative of the position of the piston within the cylinder. The position sensor utilizes a magnet which actuates discretely positioned switches to provide a signal representative of a detected one of multiple discrete positions of the piston within the cylinder, and thereby of a detected level of a vehicle on which the strut is installed.

Another example can be found in U.S. Pat. No. 5,233,293 entitled "SENSOR FOR MEASURING THE SPEED AND/OR POSITION OF A PISTON IN RELATION TO THAT OF THE CYLINDER IT MOVES INSIDE OF IN A DASHPOT OR SHOCK ABSORBER", issued on Aug. 3, 1993 to Huang et al. This patent discloses a magnetic sensor for measuring the speed of a piston in a cylinder. The sensor is also capable of providing indications of when the piston is at the end positions of its strokes. However, the magnetic sensor disclosed in the Huang et al. patent does not provide continuous position sensing capabilities to allow for the precise detection of positions between the end positions of the piston strokes. Although lacking in these prior art struts, for precise control and/or analysis of vehicle suspension strut operation, continuous position information is required.

SUMMARY OF THE INVENTION

A vehicle suspension apparatus according to the invention includes a vehicle suspension strut and a continuous position sensor coupled to the vehicle suspension strut and adapted to provide information indicative of a continuous position of a first portion of the vehicle suspension strut relative to a second portion of the vehicle suspension strut. The continuous position sensor includes a magnet coupled to the first portion of the vehicle suspension strut and a sensing mechanism coupled to the second portion of the vehicle suspension strut and responsive to the magnet to provide an output indicative of the continuous position of the first portion relative to the second portion.

BRIEF DESCRIPTION OF THE DRAWINGS

FIG. 3 is a side elevational view of the magnetostrictive transducer with an outer housing removed and a block diagram of an electric circuit.

FIG. 7 is a sectional view of the magnetostrictive transducer taken along lines 7—7 of FIG. 2.

DETAILED DESCRIPTION OF THE PREFERRED EMBODIMENTS

Figure 1:
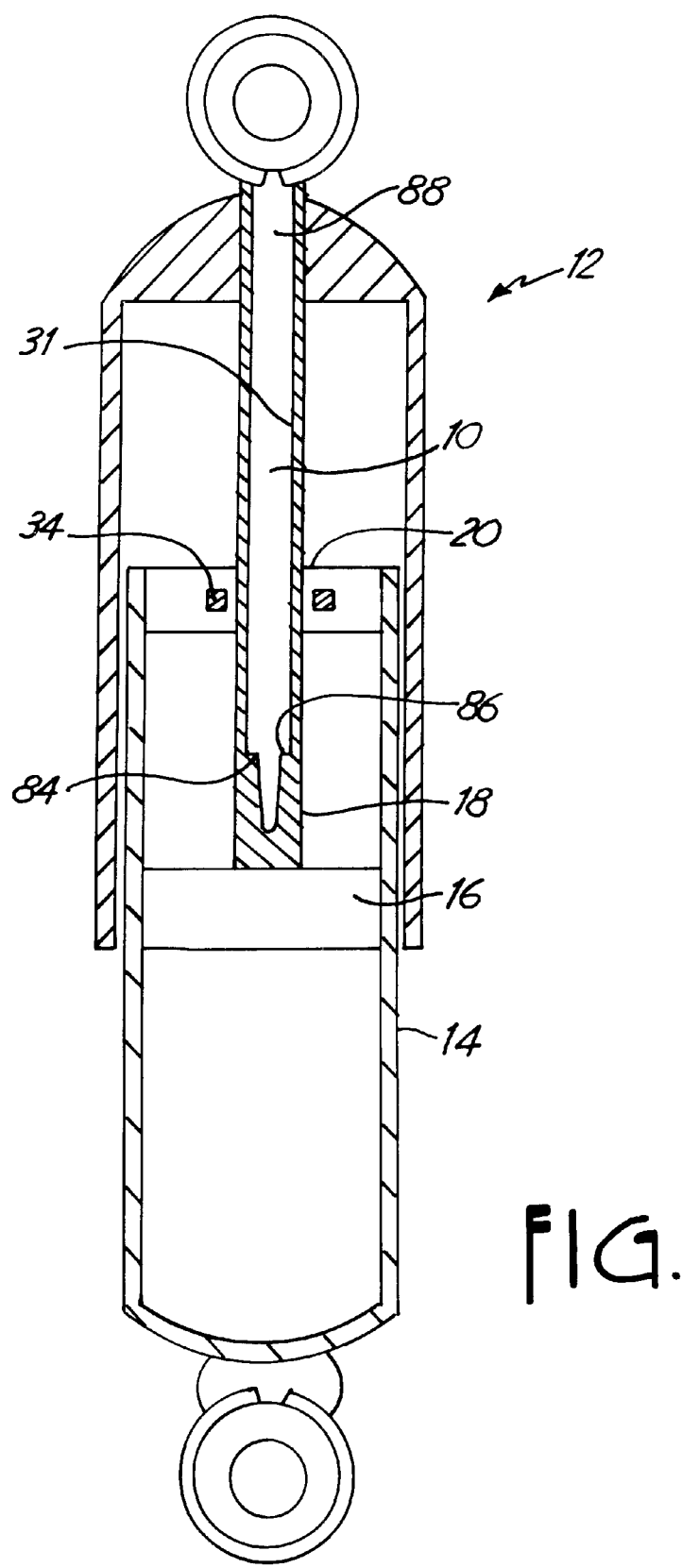
FIG. 1 is a schematic sectional view of a shock absorber having a magnetostrictive transducer.

FIG. 1 illustrates a magnetostrictive transducer 10 incorporated in a shock absorber type vehicle suspension strut illustrated schematically at 12. Although illustrated here as a shock absorber type vehicle suspension strut, the present invention can be embodied in other vehicle suspension struts such as McPherson type struts or other active vehicle suspension apparatus. As is well known, the shock absorber 12 includes a cylinder 14 and a piston 16. A piston rod 18 is secured to the piston 16 and extends through a sealed aperture 20 provided on an end of the cylinder 14. The piston rod 18 connects to a frame member (not shown) of a vehicle, while the cylinder 14 is connected to a frame portion supporting a tire and wheel assembly (also not shown). The shock absorber 12 minimizes acceleration between the frame portions of the vehicle. As will be described below, the magnetostrictive transducer 10 provides a convenient sensor to monitor the position and/or speed of the piston 16 with respect to the cylinder 14.

Figure 2:
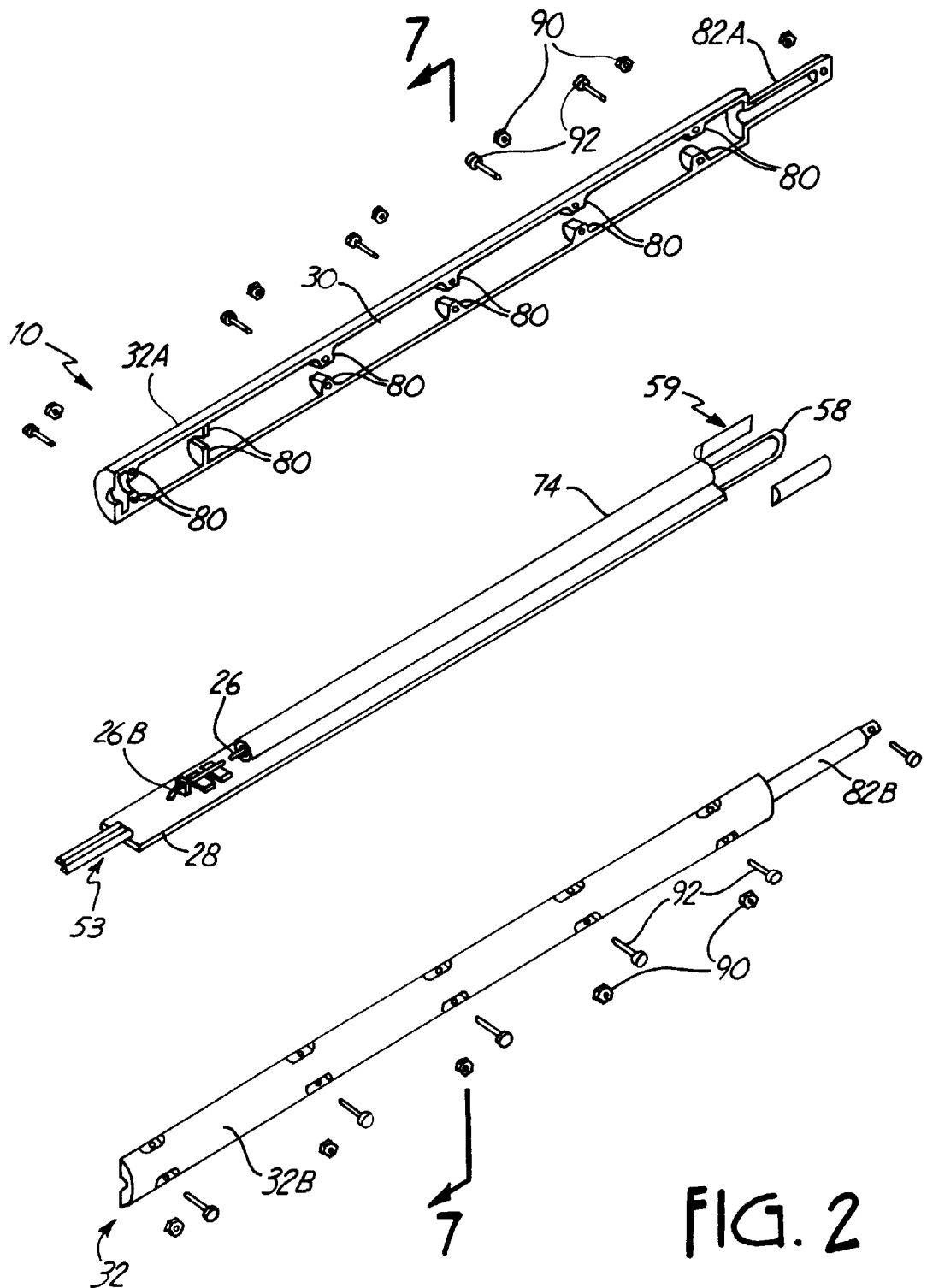
FIG. 2 is an exploded perspective view of the magnetostrictive transducer.
Figure 4:
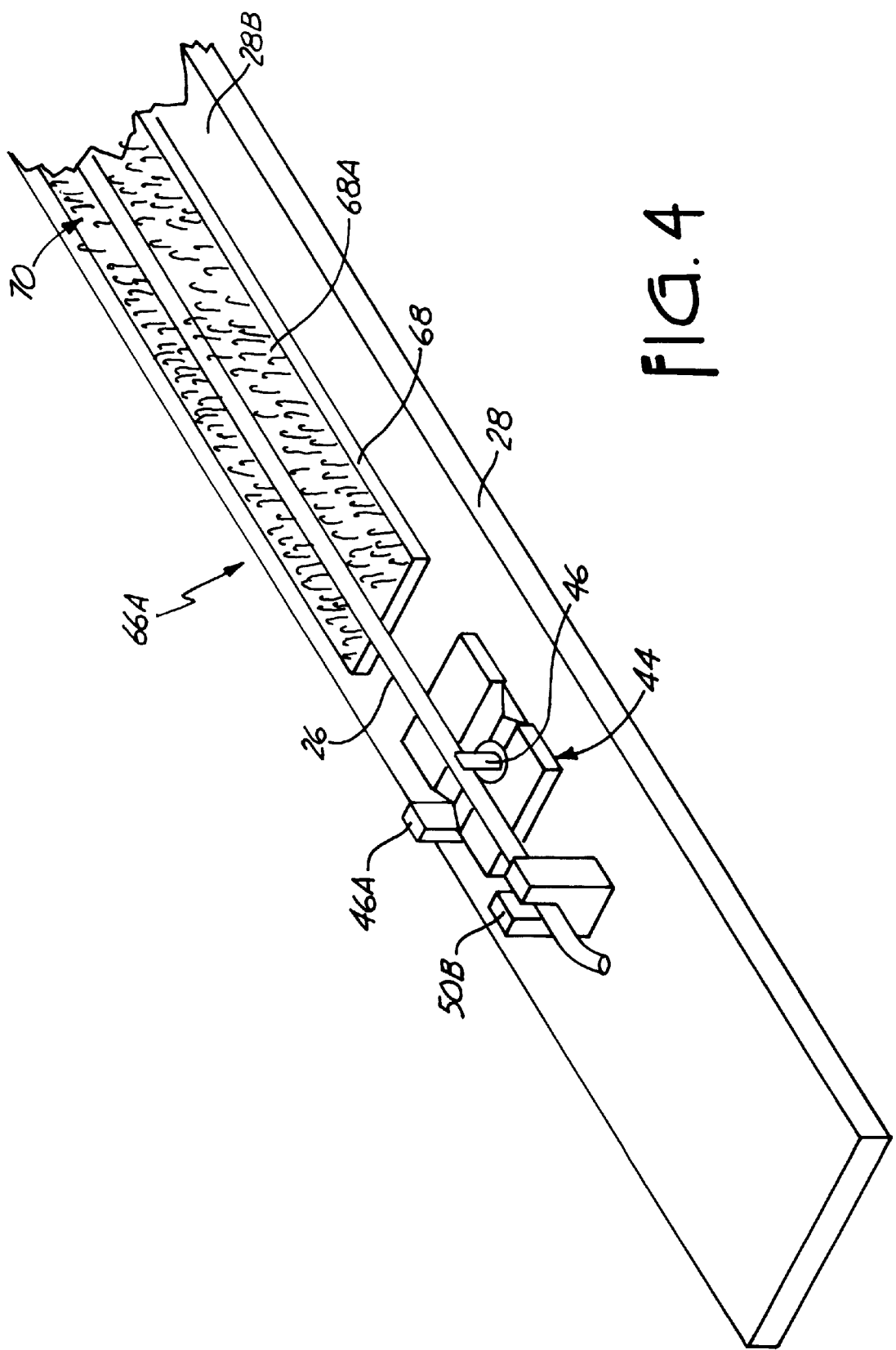
FIG. 4 is a partial perspective view of a first embodiment of a waveguide suspension element with a portion removed.
Figure 5:
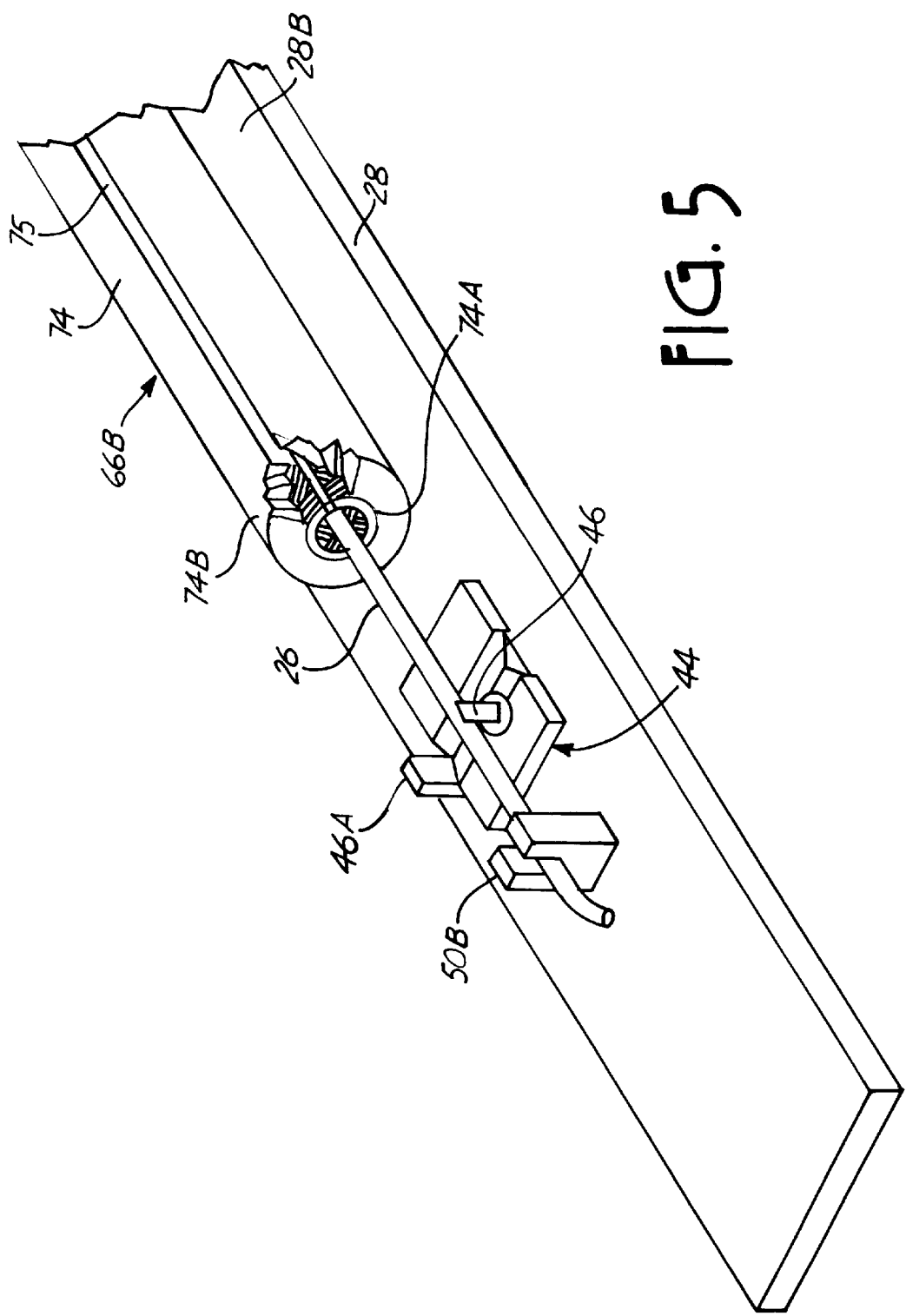
FIG. 5 is a partial perspective view of a second embodiment of a waveguide suspension element with a portion removed.
Figure 6:
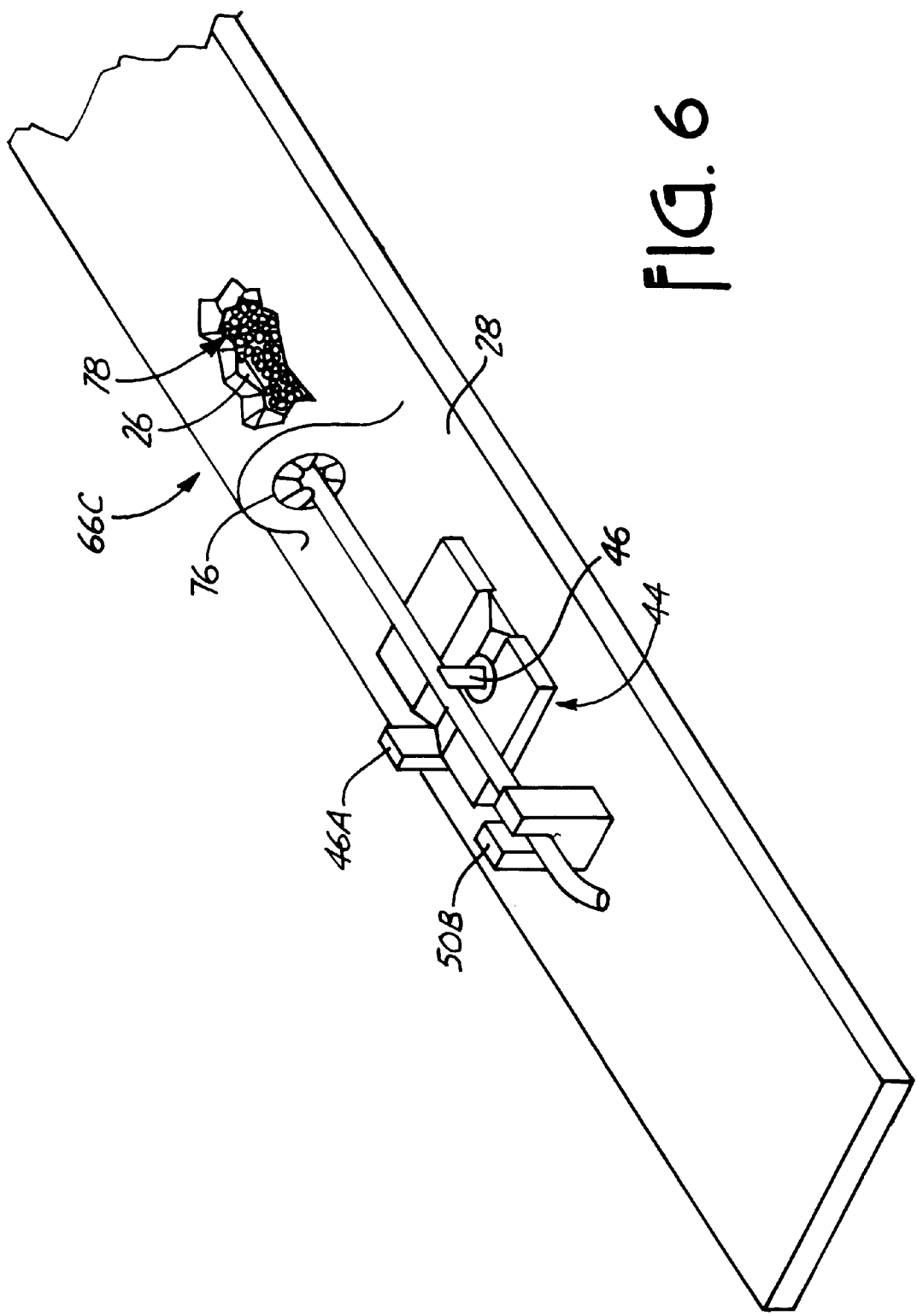
FIG. 6 is a partial perspective view of a third embodiment of a waveguide suspension element with a portion removed.

Referring also to FIGS. 2 and 3, the magnetostrictive transducer 10 includes a waveguide 26 having ends 26A and 26B that are mounted to a support plate 28. The waveguide 26 and the support plate 28 are secured in an inner cavity 30 of a housing 32 formed from housing portions 32A and 32B. The housing 32 is disposed in a longitudinal bore 31 provided in the piston rod 18. A magnet 34, such as a doughnut magnet, is joined to the cylinder 14 and oriented such that the magnetic field generated by the magnet 34 passes through the piston rod 18, the housing 32 and the waveguide 26. Electric pulses are applied to the waveguide 26 from a pulse generator 36A, forming a portion of an electronic circuit 36. A return line 38 provides a current return path for the waveguide 26 and the circuit 36. The pulse generator 36A provides a stream of electric pulses, each of which is also provided to a signal processing circuit 36B for timing purposes. When the electric pulse is applied to the waveguide 26 with current in a direction indicated by arrow 40, a magnetic field is formed surrounding waveguide 26. Interaction of this field with the magnetic field from the magnet 34 causes a torsional strain wave pulse to be launched in the waveguide 26 in both directions away from the magnet 34. A coil assembly 44 is mounted on the support plate 28. A sensing tape 46 is joined to the waveguide 26 proximate the end 26B and extends into the coil assembly 44. The strain wave causes a dynamic effect in the permeability of the sensing tape 46 which is biased with a permanent magnetic field by magnet 46A (FIGS. 4–6). The dynamic effect in the magnetic field of the coil assembly 44 due to the strain wave pulse, results in an output signal from the coil assembly 44 that is provided to the signal processing circuit 36B along signal lines 39A and 39B. By comparing the time of application of a particular electric pulse and a time of return of a sonic torsional strain wave pulse back along the waveguide 26, the signal processing circuit 36B can calculate a distance of the magnet 34 from the coil assembly 44 or the relative velocity between the waveguide 26 and the magnet 34. The signal processing circuit 36B provides an output signal, either digital or analog, proportional to the calculated distance or velocity.

The waveguide 26 is a solid magnetostrictive alloy that can conduct electric current. A suitable magnetostrictive alloy is a nickel-iron alloy of approximately 30 to 50% nickel. The waveguide 26 is bendable and substantially rigid so that it retains its shape. Preferably, a loop portion 58 is formed in the waveguide 26 and has a 180 degree bend to allow for a smaller diameter section for a "damp" material 59, described below, and for thermal expansion.

Unlike magnetostrictive transducers of the prior art, the magnetostrictive transducer 10 is a compact assembly in that in the preferred embodiment, the support plate 28 further forms a base for the circuit 36. Specifically, components such as resistors, capacitors and integrated circuit devices generally designated at 41 in FIG. 3 for the circuit 36 are conventionally soldered to conductive traces formed on a surface 28A and, if necessary, a surface 28B of the support plate 28. Signal wires 53 provide electric power and transmit the output signal from the signal processing circuit 36B. In the embodiment illustrated, the waveguide 26 is suspended over the surface 28B. Standoffs 50A and 50B support the waveguide 26 and provide an electrical connection to the conductive traces of the circuit 36.

Damping is provided on the waveguide 26 to control propagation of the strain wave pulse and mechanically isolate the waveguide 26 from the shock and vibration. A first damping element is illustrated at 56 in FIG. 3. The damping element 56 controls propagation of one of the strain wave pulses. When the electric pulse forms a magnetic field surrounding the waveguide, interaction of this field with the magnetic field from the magnet 34 causes a torsional strain wave pulse to be launched in the waveguide 26 in both directions away from the magnet 34, a first strain wave pulse propagates down the waveguide 26 toward the coil assembly 44, as described above. However, a second strain wave pulse propagates down the waveguide 26 away from the coil assembly 44. The damping element 56 attenuates or dampens the second strain wave pulse so it is not reflected back by the standoff 50A. Although the standoff 50A is illustrated joined to the support plate 28 on the surface 28A, if desired, the standoffs 50A and 50B can be mounted on the same side of the support plate 28.

The damping element 56 can be a suitable quantity of silicon rubber that is attached to the waveguide 26 as illustrated in FIG. 3 or a two-piece compliant assembly indicated at 59 in FIG. 2. Referring back to FIG. 3, it should be understood that the stroke or active sensing region of the magnetostrictive transducer 10 is defined by a portion of the waveguide 26 extending between the damping element 56 and the coil assembly 44. It should also be understood that the length of the waveguide 26 need not coincide with the longitudinal length of the support plate 28. In other words, the loop portion 58 can extend well beyond an end 28D of the support plate 28. The damping element 56 can be formed along any portion of the loop 58. However, to maximize the stroke of the magnetostrictive transducer 10 and minimize the overall length of the magnetostrictive transducer 10, the damping element 56 is disposed on a remote end 58C of the loop portion 58.

Referring to FIGS. 4–6, three embodiments of second damping element 66A, 66B and 66C are interposed between the waveguide 26 and the support late 28 to mechanically isolate the waveguide 26 from shock, vibration and contact with the support board 28. In FIG. 4, the second damping element 66A comprises a strip of material 68 that is suitably adhered to the surface 28B. A surface 68A of the strip of material 68 faces the waveguide 26, and includes compliant projections 70 that lightly contact the waveguide 26 along its length. In this manner, the projections 70 isolate the waveguide 26 from the support plate 28, yet allow strain pulses to propagate along the waveguide 26.

FIGS. 2, 5 and 7 illustrate a second embodiment of the second damping element 66B. In this embodiment, the second damping element 66B comprises a tube 74 extending along the length of the waveguide 26. The tube 74 includes an inner layer 74A and an outer support layer 74B. The inner layer 74A is soft, such as a soft braided material as depicted, that contacts the waveguide 26 in order to provide mechanical isolation. If desired, a longitudinal slit 75 can be provided along the length of the tube 74 through the inner layer 74A and outer support layer 74B. The longitudinal slit 75 allows the tube 74 to be placed around the waveguide 26 after ends 26A and 26B of the waveguide 26 have been attached to the standoffs 50A and 50B. If desired, the tube 74 can be secured to the surface 28B.

A third embodiment of the damping element 66C is illustrated in FIG. 6. In this embodiment, the damping element 66C comprises a suitable material, such as an elastomer film, that can be blown into a bore 76 formed separately and attached, or formed integrally with the support plate 28, as shown. When blown into the bore 76, the material forms air pockets 78 which mechanically isolate the waveguide 26 from inner surfaces of the bore 76. The waveguide 26 can be inserted in the bore 76 prior to or after the material has been blown into the bore 76.

Referring to FIGS. 2 and 7, the housing 32 comprises housing portions 32A and 32B, which when joined together, form the inner cavity 30. Support blocks 80 are formed in an inner surface of each housing portion 32A and 32B to receive edge portions of the support plate 28. If desired, a single continuous recess, not shown, can be provided in each of the housing portions 32A and 32B to replace the spaced-apart support blocks 80. Referring to FIG. 2, each housing portion 32A and 32B includes a reduced diameter portion 82A and 82B, respectively. When joined together, the reduced diameter portions 82A and 82B form a cavity for the loop portion 58. The housing portions 32A and 32B can be joined together using nuts 90 and bolts 92 as illustrated, or integral snaps, now shown, with or without an adhesive. A potting material can be provided in the inner cavity 30 to further secure the support plate 28 in place.

Referring back to FIG. 1, the reduced diameter portions 82A and 82B form an annular surface 84 that contacts a shoulder 86 provided in the piston rod 18. A suitable end cap, such as a threaded nut 88, is provided on an end of the piston rod 18 to hold the magnetostrictive transducer 10 in place.

Figure 8:
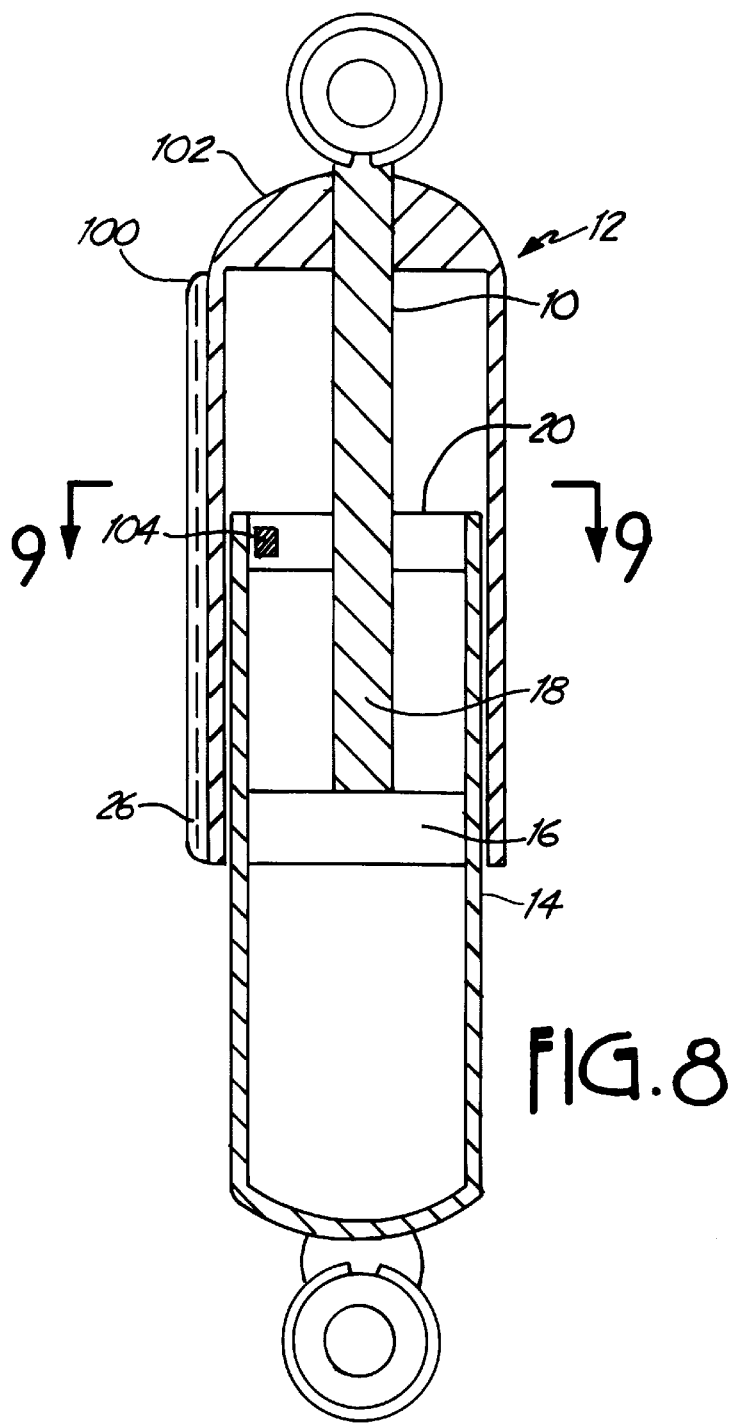
FIG. 8 is a schematic sectional view of a shock absorber illustrating an alternative position for the magnetostrictive transducer.
Figure 9:
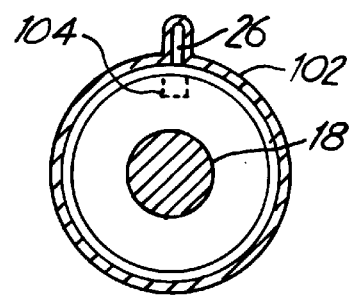
FIG. 9 is a sectional view taken along lines 9—9 of FIG. 8.

FIGS. 8 and 9 illustrate an alternative position for a magnetic transducer such as magnetostrictive transducer 100. The magnetostrictive transducer 100 is similar to the transducer 10 described above having a waveguide 26. In this embodiment, the magnetostrictive transducer 100 is attached to or formed integrally with an outer housing 102 of the shock absorber 12. The outer housing 102 is rigidly attached to the piston rod 18. A permanent magnet 104 is joined to the cylinder 14 and oriented such that the magnetic field generated by the magnet 104 passes through the waveguide 26. Although illustrated being formed on an outer surface of the outer housing 102, it should be understood that the magnetostrictive transducer 100 can be formed on an inner surface of the outer housing 102 or formed completely within the wall of the outer housing 102.

Figure 10:
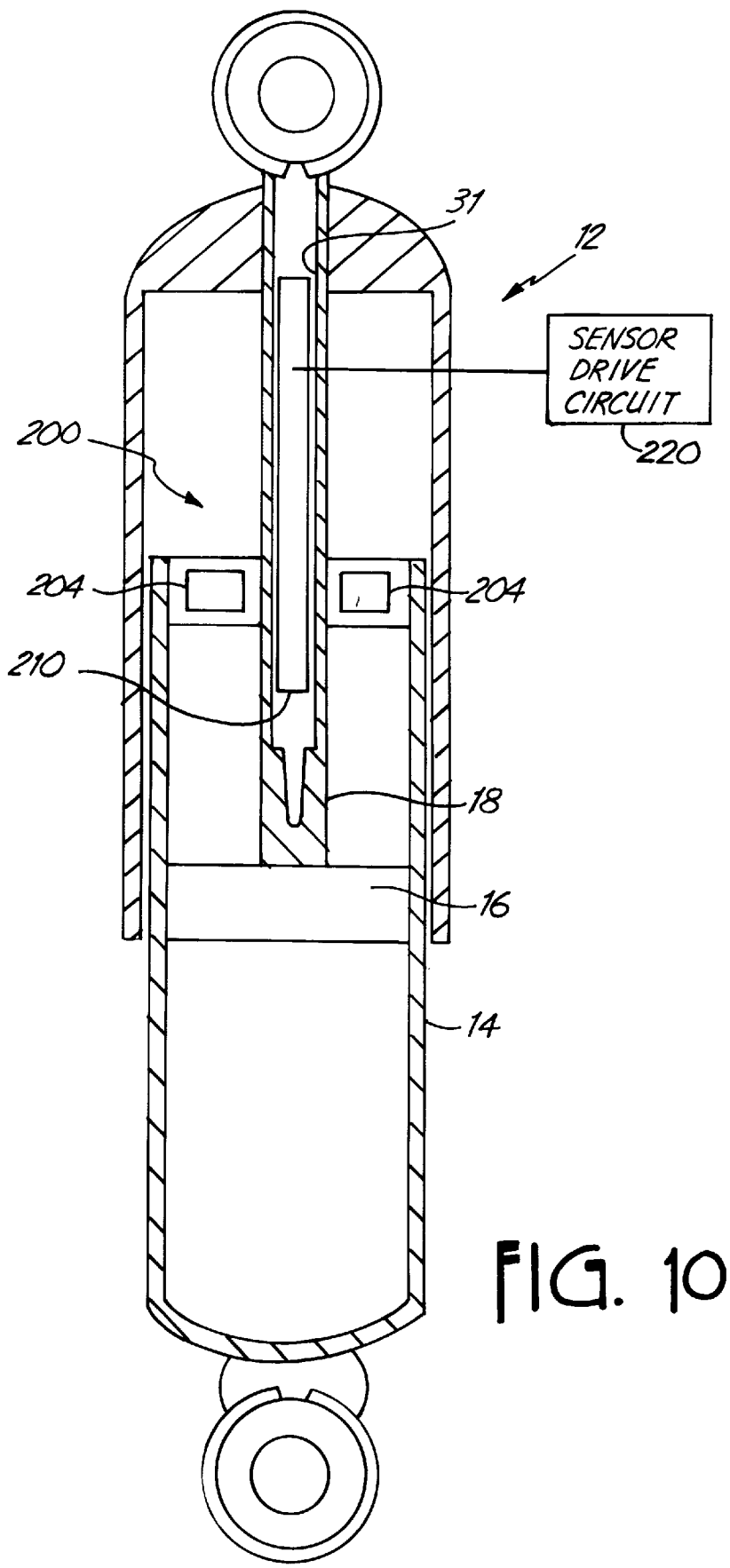
FIG. 10 is a diagrammatic sectional view of a shock absorber type vehicle suspension strut having a continuous position sensor.

The above-described vehicle suspension strut embodiments provide information indicative of a continuous position (as opposed to a limited accuracy discrete position) of piston 16 relative to cylinder 14. FIG. 10 illustrates another embodiment of vehicle suspension strut 12 having continuous position sensor 200 in order to provide information relating to a continuous position of piston 16 relative to cylinder 14. In some embodiments, continuous position sensor 200 includes permanent magnet 204 attached to cylinder 14 and sensing mechanism 210 coupled to a portion of strut 12 which moves in conjunction with piston 16. In the illustrated embodiment, sensing mechanism 210 is positioned within bore 31 of piston rod 18. However, sensing mechanism 210 can be positioned elsewhere on strut 12. Sensing mechanism 210 is responsive to magnetic fields from permanent magnet 204 to provide an output indicative of a continuous position of piston 16 within cylinder 14.

In some embodiments of the present invention, sensing mechanism 210 (i.e., means for sensing) is a magnetostrictive transducer as described above. In other embodiments of the present invention, sensing mechanism 210 is a magnetic permeability sensor responsive to the magnetic field from magnet 204 and adapted to provide an output indicative of the permeability of a magnetically permeable material, and thereby indicative of the continuous position of piston 16 within cylinder 14. Various magnetic permeability type sensors are described below in greater detail. In yet other embodiments, sensing mechanism 210 can be other types of sensors responsive to magnetic fields from permanent magnet 204. For example, sensing mechanism 210 can be an inductive or a magnetoresistive transducer. Sensing mechanism 210 can also be a Hall effect type transducer.

A sensor drive circuit 220 drives sensing mechanism 210 in any of a variety of known manners. For example, if sensing mechanism 210 is a magnetic permeability sensor, sensor drive circuit 220 can be an oscillator, having the permeability sensor 210 connected in the feedback of the oscillator. Changes in permeability of the sensor caused by magnet 204 result in changes in inductance of sensor 210. The change in inductance in sensor 210 results in a change in frequency of a signal generated by the oscillator. In embodiments in which sensing mechanism 210 is a magnetoresistive or inductive transducer, drive circuit 220 can be a voltage or current sensing circuit. Other drive circuit types can be used with these and other types of magnetic field sensing mechanisms.

Figure 11:
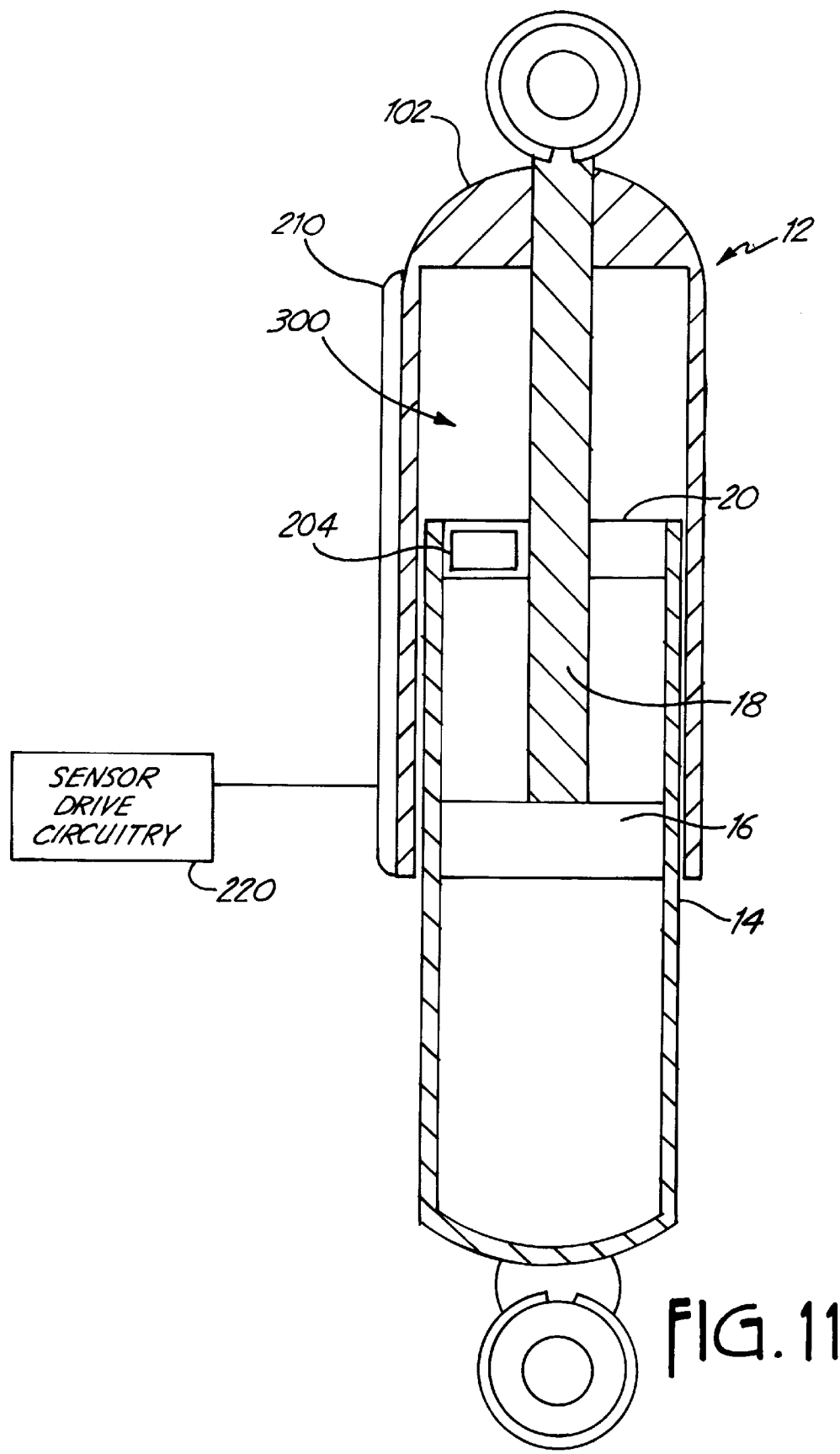
FIG. 11 is a diagrammatic sectional view of a vehicle suspension strut having a continuous position sensor disposed at a location different from the location of the position sensor of the vehicle suspension strut illustrated in FIG. 10.

FIG. 11 illustrates vehicle suspension strut 12 having continuous position sensor 300. Position sensor 300 differs from magnetic field sensing mechanism 200 illustrated in FIG. 10 in that the position sensor is located at an alternative position. As illustrated in FIG. 11, in continuous position sensor 300, sensing mechanism 210 is once again coupled to piston 14 such that it moves in conjunction with the piston. However, in this embodiment sensing mechanism 210 is attached to, or formed integrally with, outer housing 102 of vehicle suspension strut 12. Outer housing 102 is rigidly attached to and moves in conjunction with piston rod 18. In an embodiment in which sensing mechanism 210 is positioned on a particular side of housing 102, permanent magnetic 204 can be connected to chamber 14 at a corresponding side. However, in other embodiments, permanent magnetic 204 is an annular or doughnut magnet positioned adjacent to all sides of housing 102. As with continuous position sensor 200 illustrated in FIG. 10, in continuous position sensor 300, sensing mechanism 210 can be of any of the above-described types which are driven by sensor drive circuitry 220 and are responsive to magnetic fields from permanent magnet 204.

Figure 12:
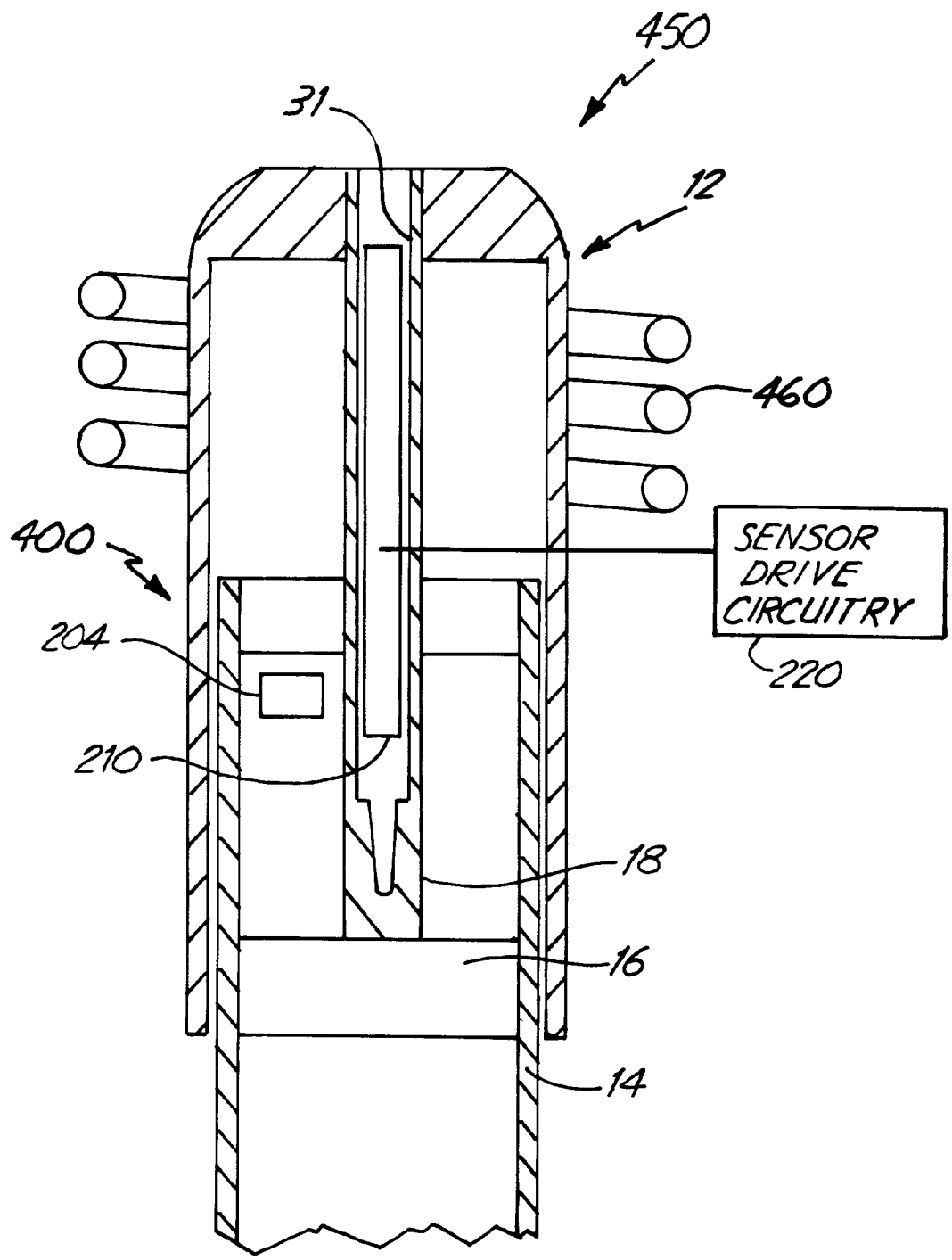
FIG. 12 is a diagrammatic sectional view of a McPherson type vehicle suspension strut having a continuous position sensor.

FIG. 12 diagrammatically illustrates a cross section of a McPherson type vehicle suspension strut 450 which includes a telescopic shock absorber type strut 12 and a compression spring 460. Vehicle suspension strut 450 illustrated in FIG. 12 includes continuous position sensor 400 which is similar to continuous position sensors 200 and 300 illustrated in FIGS. 10 and 11. For the sake of illustration, in continuous position sensor 400, permanent magnet 204 is coupled to housing 14, but in a slightly different position as compared to continuous position sensors 200 and 300. In each of the illustrated embodiments of the present invention, the location of permanent magnet 204 and of sensing mechanism 210 can be varied as desired for particular design goals or limitations. As with continuous position sensors 200 and 300 described above, permanent magnet 204, sensing mechanism 210 and sensor drive circuitry 220 can be any of the above-described types.

Figure 15:
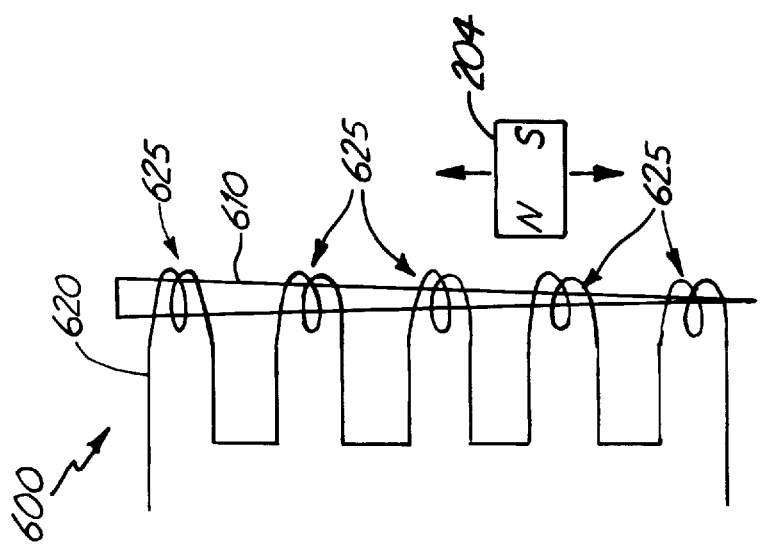
FIGS. 13–15 are diagrammatic illustrations of three magnetic permeability sensors which can be used as continuous position sensors in the vehicle suspension struts of the present invention.
Figure 14:
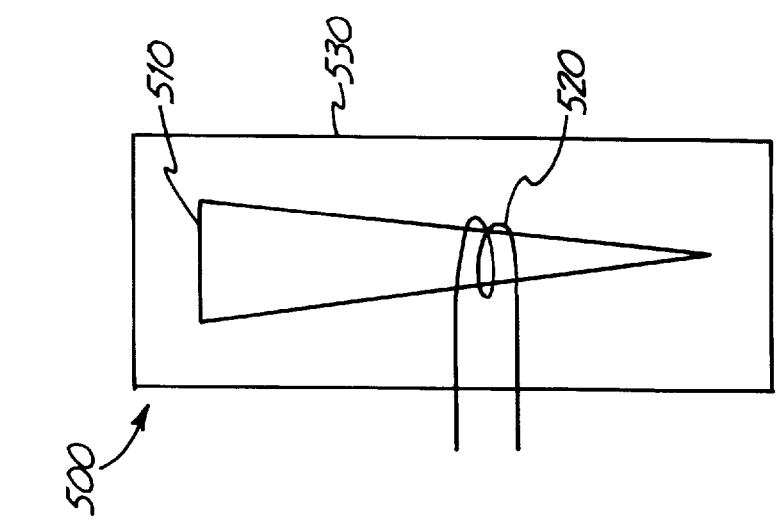
Figure 13:
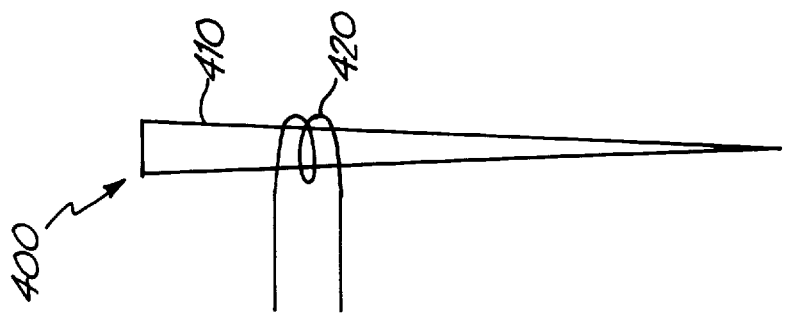

FIGS. 13–15 are diagrammatic illustrations of continuous position sensors which can be used as sensors 200, 300 and 400 illustrated in FIGS. 10–12. Each of continuous position sensors 400, 500, and 600 utilize magnetic permeability sensors to provide the information indicative of the continuous position of the vehicle suspension strut. Position sensors 400 and 500 illustrated in FIGS. 13 and 14 do not necessarily require the use of permanent magnet 204, while position sensor 600 does utilize permanent magnet 204.

Each of these continuous position sensors utilizes a length of permeable material, having its permeability varying along its length. The variation in permeability can be achieved by changing the physical dimensions along its length. The permeability variation can then be measured by a permeability sensor, with or without the use of a permanent magnet. The output of the permeability sensor represents the position relationship between the permeable material and the permeability sensor, which can be correlated to a position of piston 16 within cylinder 14 and thus to a position of a first vehicle frame portion relative to a second vehicle frame portion.

Continuous position sensor 400 illustrated in FIG. 13 includes a length of permeable material 410 formed in the shaped of an elongated cone. Continuous position sensor 400 also includes permeability sensor 420, which can be a coil adapted to move relative to permeable material 410 in its elongated direction. By way of example, in the embodiment of the present invention illustrated in FIGS. 10 and 12, permeable material 410 can be positioned within bore 31 of piston rod 18, while coil 420 is attached to cylinder 14.

Permeable material 410, formed in the shape of the elongated cone, can be a tapered wire made from a temperature stable permeable alloy such as Ni Span-C. As mentioned above, this tapered wire can be stationary with respect to an area over which the position measurement is to be made. The permeability sensor 420 can be attached to, or otherwise made to move in conjunction with, the component of which is it desired to know the position. Logically, permeability sensor 420 can be attached to cylinder 14 while permeable material 410 is attached to or moves in conjunction with piston 16, or vise versa.

Permeability sensor 420 is connected to any circuit, well known in the art, which can measure the change in permeability as it moves along the tapered wire. A typical sensor drive circuit 220 (see FIGS. 10–12) of the invention can be adapted to measure a change in inductance of permeability sensor 420. A common method of measuring change in inductance would be to place permeability sensor 420 in the feedback loop of an oscillator and to note the frequency change with change in inductance. Another method would be to measure an amplitude change in the signal. In the alternative, permeability can be measured with a standard Hall effect sensor.

Continuous position sensor 500 illustrated in FIG. 14 includes a flat permeable material 510 having a width which varies along its length. In one embodiment, permeable material 510 forms a triangle shaped metallic area plated onto a printed circuit board material 530. The plating can be of a permeable material suitable for plating, such as Nickel. This plated permeable material is stationary with respect to an area over which the position measurement is to be made.

Permeability sensor 520, which can again be a coil, is attached to or otherwise made to move in conjunction with the component of which it is desired to know the position. Like the continuous position sensors described with reference to FIG. 13, permeability sensor 520 is connected to a drive circuit 220 (not shown in FIG. 14) which can measure the change in permeability as sensor 520 moves along the plated permeable material 510. As described above, the sensor drive circuit 220, which measures the change in inductance of the coil, can be an oscillator circuit providing a signal having a frequency and/or an amplitude which varies with inductance change. Alternatively, permeability can be measured with a standard Hall effect sensor.

Continuous position sensor 600 illustrated in FIG. 15 utilizes permanent magnetic 204 to provide continuous position information. Position sensor 600 includes permeable material 610, permeability sensor 620 and permanent magnet 204. Permeable material 610 has a width which varies along its length. As described above, permeable material 610 can be a triangle shaped metallic area plated on to a printed circuit board material if desired. Plating can be of a permeable material suitable for plating, such as Nickel. This plated material can be positioned on the vehicle suspension strut in a position which is stationary with respect to an area over which the position measurement is to be made. Permeability sensor 620 is a sensor array aligned with permeable material 610. In one embodiment, permeability sensor 620 is a series of coils 625, which remain stationary relative to permeable material 610.

Permanent magnet 204 is attached to, or otherwise made to move in conjunction with, the component of which it is desired to know the position. As the magnet comes in alignment with a particular area of the permeable material 610, that area will experience a reduction in permeability due to the magnetic field from the permanent magnet. This results in the overall permeability of permeable material 610 changing as a function of magnet position. Since the series of coils of permeability sensor 620 measures the overall permeability of the permeable material, the position of the permanent magnet is indicated by the reading of the permeability sensor 620.

The permeability sensor can be connected to any circuit, such as sensor drive circuit 220 (not shown in FIG. 15), which can measure the change in permeability as described above. As described above, a standard method to measure permeability utilizes an oscillator signal which has a frequency and/or an amplitude that varies as a function of the inductance of permeability sensor 620. Again, in the alternative, permeability can be measured using a standard Hall effect sensor. Other methods of measuring permeability can be used as well.

Although the present invention has been described with reference to preferred embodiments, workers skilled in the art will recognize that changes may be made in form and detail without departing from the spirit and scope of the invention.

What is claimed is:

1. A vehicle suspension apparatus comprising:

a vehicle suspension strut; and a continuous position sensor coupled to the vehicle suspension strut and adapted to provide information indicative of a continuous position of a first portion of the vehicle suspension strut relative to a second portion of the vehicle suspension strut, the continuous position sensor comprising:

a magnet coupled to the first portion of the vehicle suspension strut; and a sensing mechanism coupled to the second portion of the vehicle suspension strut and responsive to the magnet to provide an output indicative of the continuous position of the first portion relative to the second portion, wherein the sensing mechanism comprises a magnetically permeable material which has a magnetic permeability which changes in response to a magnetic field from the magnet and a permeability sensor adapted to provide an output indicative of the permeability of the magnetically permeable material and thereby indicative of the continuous position of the first portion relative to the second portion.

2. The vehicle suspension apparatus of claim 1, wherein the permeability sensor comprises:

at least one coil magnetically coupled to the magnetically permeable material; and a circuit coupled to the at least one coil.

3. The vehicle suspension apparatus of claim 2, wherein the circuit is adapted to measure an inductance of the at least one coil.

4. The vehicle suspension apparatus of claim 3, wherein the circuit comprises an oscillator adapted to generate a signal at a frequency and at an amplitude, and wherein at least one of the frequency of the signal and the amplitude of the signal changes as the inductance of the coil changes in response to changes in the magnetic permeability of the magnetically permeable material.

5. The vehicle suspension apparatus of claim 2, wherein the magnetically permeable material comprises a length of tapered wire.

6. The vehicle suspension apparatus of claim 2, wherein the magnetically permeable material comprises a magnetically permeable material plated onto a circuit board.

7. A vehicle suspension apparatus comprising:

a vehicle suspension strut; and a continuous position sensor coupled to the vehicle suspension strut and adapted to provide information indicative of a continuous position of a first portion of the vehicle suspension strut relative to a second portion of the vehicle suspension strut, the continuous position sensor comprising:

a magnet coupled to the first portion of the vehicle suspension strut; and a magnetostrictive transducer coupled to the second portion of the vehicle suspension strut and responsive to the magnet to provide an output indicative of the continuous position of the first portion relative to the second portion.

8. A vehicle suspension apparatus comprising:

a vehicle suspension strut; and a continuous position sensor coupled to the vehicle suspension strut and adapted to provide information indicative of a continuous position of a first portion of the vehicle suspension strut relative to a second portion of the vehicle suspension strut, the continuous position sensor comprising:

a magnet coupled to the first portion of the vehicle suspension strut; and a magnetoresistive transducer coupled to the second portion of the vehicle suspension strut and responsive to the magnet to provide an output indicative of the continuous position of the first portion relative to the second portion.

9. A vehicle suspension apparatus comprising:

a vehicle suspension strut; and a continuous position sensor coupled to the vehicle suspension strut and adapted to provide information indicative of a continuous position of a first portion of the vehicle suspension strut relative to a second portion of the vehicle suspension strut, the continuous position sensor comprising:

a magnet coupled to the first portion of the vehicle suspension strut; and an inductive transducer coupled to the second portion of the vehicle suspension strut and responsive to the magnet to provide an output indicative of the continuous position of the first portion relative to the second portion.

* * * * *

UNITED STATES PATENT AND TRADEMARK OFFICE
CERTIFICATE OF CORRECTION

PATENT NO.   : 6,401,883 B1
DATED        : June 11, 2002
INVENTOR(S)  : David S. Nyce et al.

It is certified that error appears in the above-identified patent and that said Letters Patent is hereby corrected as shown below:

<u>Title page,</u>
Item [60], Related U.S. Application Data, delete "Provisional application No. 60/155,606, filed on Sep. 22, 1999" and insert -- Provisional application No. 60/155,606, filed on September 22, 1999 and U.S. patent application Serial No. 09/391,038 (now abandoned), filed on September 7, 1999, which is a continuation of U.S. patent application Serial No. 08/828,193, filed on March 21, 1997 and now issued as U.S. Patent No. 5,952,853. --

Signed and Sealed this

Twelfth Day of November, 2002

*Attest:*

*Attesting Officer*

JAMES E. ROGAN
*Director of the United States Patent and Trademark Office*